United States Patent
Nomura et al.

(10) Patent No.: US 7,268,781 B2
(45) Date of Patent: Sep. 11, 2007

(54) IMAGE DISPLAY CONTROL METHOD

(75) Inventors: Kouichi Nomura, Tokyo (JP); Kenji Furukawa, Tokyo (JP)

(73) Assignee: Sega Corporation (JP)

( * ) Notice: Subject to any disclaimer, the term of this patent is extended or adjusted under 35 U.S.C. 154(b) by 131 days.

(21) Appl. No.: 11/166,224

(22) Filed: Jun. 27, 2005

(65) Prior Publication Data

US 2006/0061571 A1    Mar. 23, 2006

(30) Foreign Application Priority Data

Jun. 30, 2004    (JP)    ............... 2004-194460

(51) Int. Cl.
*G06T 15/00*    (2006.01)
(52) U.S. Cl. .................. 345/427; 382/118; 348/48
(58) Field of Classification Search ............... 345/420, 345/427; 382/118; 348/43, 48
See application file for complete search history.

(56) References Cited

U.S. PATENT DOCUMENTS 6,081,275 A * 6/2000 Kojima .................. 345/427
6,972,756 B1  12/2005 Yamamoto ............... 345/156
6,989,829 B2 * 1/2006 Haga et al. ............... 345/418
7,118,498 B2 * 10/2006 Meadows et al. .......... 473/407

FOREIGN PATENT DOCUMENTS

| JP | 2002-018127 | 1/2002 |
| JP | 2002-18128 | 1/2002 |
| WO | WO99/027498 | 6/1999 |

\* cited by examiner

*Primary Examiner*—Phu K. Nguyen
(74) *Attorney, Agent, or Firm*—Dickstein Shapiro LLP

(57) ABSTRACT

In a game system, a player can displace direction of a view line disposed in a three-dimensional space coordinate system to change the corresponding perspective-projected image by changing the aim of the gun-type controller, by setting a specific region on a perspective projection plane; detecting a designated position with respect to a display plane, which is designated; determining whether or not the designated position is located in a specific region; displacing the view line direction or moving the view point position based on the positional relationship of the designated position and the specific region when the designated position is not positioned inside the specific region; and finding a two-dimensional image obtained by perspective projection in the new view line direction after the displacement of the view line direction or movement of the view point position and displaying two-dimensional images on the display device.

19 Claims, 12 Drawing Sheets

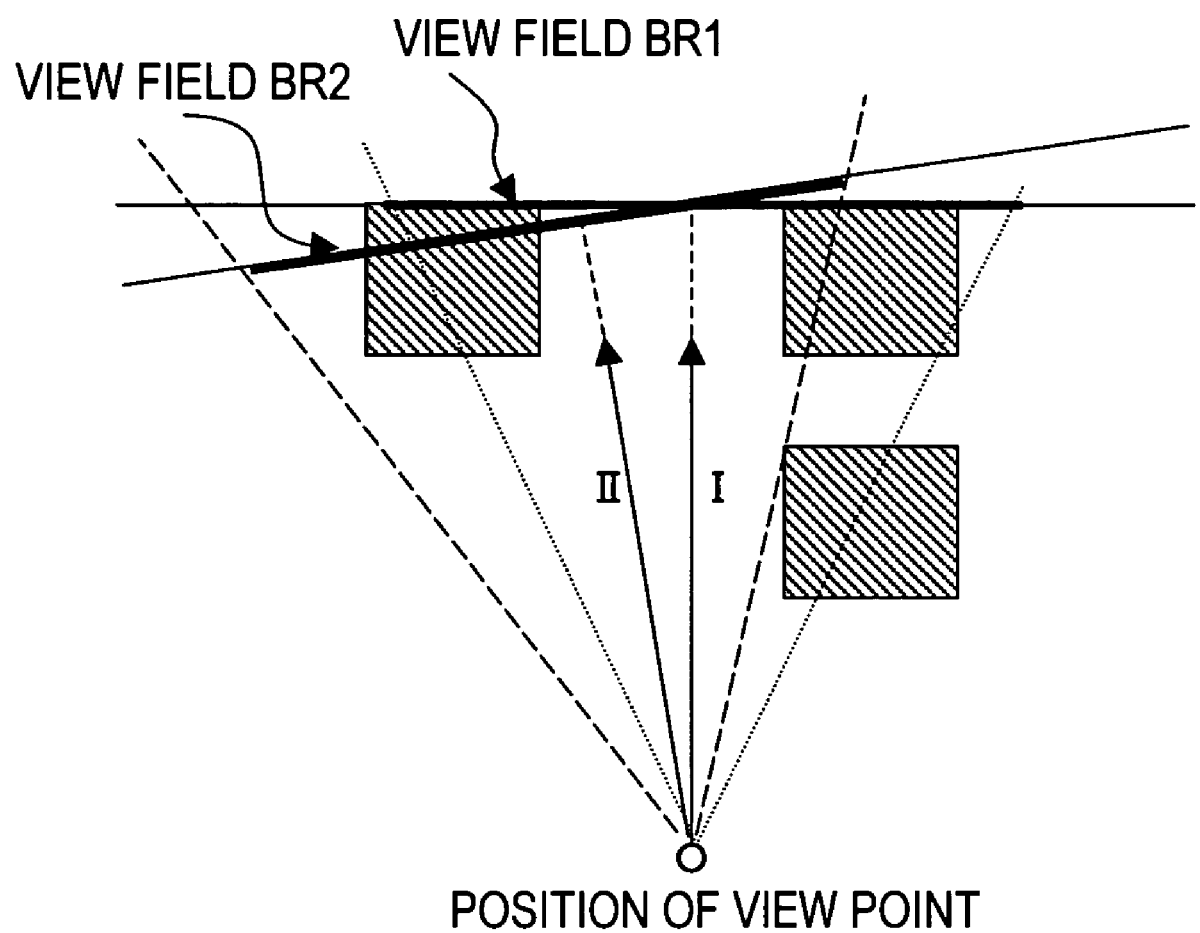

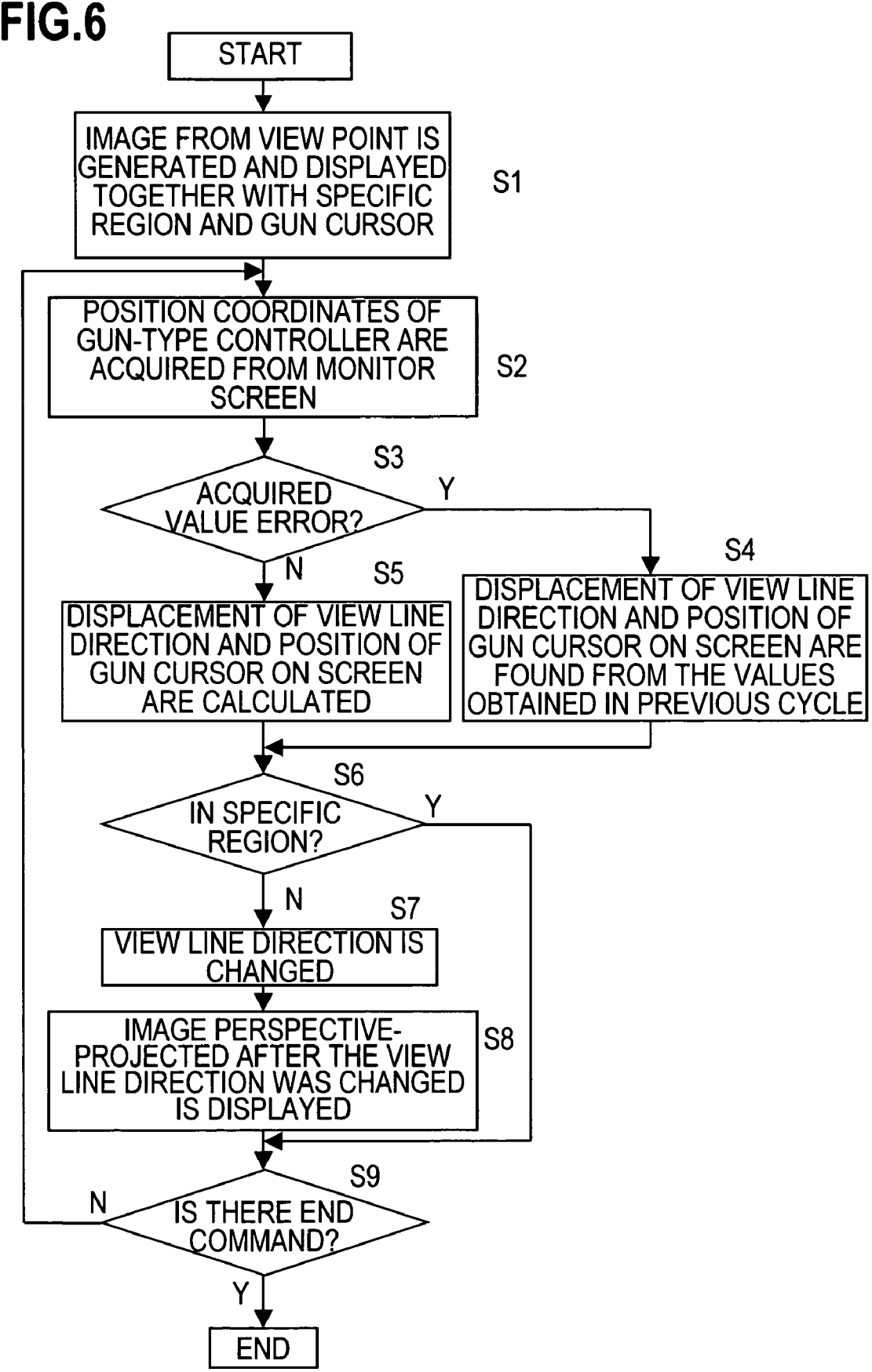

IMAGE DISPLAY CONTROL METHOD

BACKGROUND OF THE INVENTION

1. Field of the Invention

The present invention relates to a display control method for display devices that display an image obtained by perspective-projecting an image model located in a virtual three-dimensional coordinate space onto a two-dimensional plane in the prescribed view line direction. More particularly, the present invention relates to an image display control method making it possible to control the displayed image following the displacement of the view line direction or the movement of the view point position by the player's operations in a shooting game.

2. Description of the Related Art

There are shooting games in which an image obtained by perspective-projecting a three-dimensional spatial image model comprising a character image, which is a target, in a virtual three-dimensional coordinate space onto a two-dimensional plane in the view line direction is displayed on a display device and the game is advanced by simulation shooting at the displayed character image with a simulation gun operated by a player.

As an example of such a shooting game, a technology was suggested (Japanese Patent Application Laid-open No. 2002-18128) in which the simulation gun (gun-type controller) was provided with an input key such as a cross-direction key and the selection operations such as the movement of the character operated by the player, changes in the disposition of the enemy character, and weapon used by the characters were facilitated.

On the other hand, it is expected that in the shooting game a feeling of virtual reality shooting be created for the player by changing the view line direction or view point position in the virtual three-dimensional coordinate space according to the intensions of the player himself so as to confront the enemy character.

However, in the conventional shooting games, the displayed images change according to the preset program and the player can change the observation point of the gun-type controller only within a range of prescribed displayed images that are displayed according to the program. Thus, the view line direction or view point position in the virtual three-dimensional coordinate space are not changed by the player's operations.

Therefore, the view line direction and view point position are fixed unless the displayed image on the screen is changed by the program, and the range for taking aim with the gun-type controller is fixed in advance by the program. Thus, the idea of timely changing the view line direction or view point position by the player's operations and changing the range for taking aim with the gun-type controller did not exist as prior art technology.

The aforementioned Japanese Patent Application Laid-open No. 2002-18128, too, contained no description suggesting the technology of changing the view line direction or view point position by the player's operations.

SUMMARY OF THE INVENTION

It is an object of the present invention to provide a display control method for images displayed on a display device, this method allowing the player to change the view line direction and view point position.

The first aspect of the present invention that attains the above-described object is an image display control method in a game system having an image display unit for displaying a two-dimensional image obtained by perspective-projecting an image model disposed in a virtual three-dimensional space onto a perspective projection plane in a view point coordinate system of view points set in the virtual three-dimensional space, a designation unit for designating a position on the display plane of the image display unit, a detection unit for detecting the designated position of the designation unit with respect to the display plane of the image display unit, and a control unit for execution-controlling a game based on the detection signals from the detection unit and controlling the view point or view line direction in the virtual three-dimensional space, the method including the steps of setting a specific region on the perspective projection plane, detecting the designated position with respect to the display plane, which is designated by the designation unit, determining whether or not the designated position is located in the specific region, displacing the view line direction or moving the view point position based on the positional relationship of the designated position and the specific region when the designated position is not positioned inside the specific region, and finding a two-dimensional image obtained by perspective projection in the new view line direction after the displacement of the view line direction or movement of the view point position and displaying this two-dimensional image on the display device.

A second aspect of the present invention that attains the above-described object is a program to be executed in a game system having an image display unit for displaying a two-dimensional image obtained by perspective-projecting an image model disposed in a virtual three-dimensional space onto a perspective projection plane in a view point coordinate system of view points set in the virtual three-dimensional space, a designation unit for designating a position on the display plane of the image display unit, a detection unit for detecting the designated position of the designation unit with respect to the display plane of the image display unit, and a control unit for execution-controlling a game based on the detection signals from the detection unit and controlling the view point or view line direction in the virtual three-dimensional space, the program executing a step of detecting in the detection unit the designated position of the designation unit with respect to the display plane, a step of computing with the control unit a specific position on the perspective projection plane corresponding to the designated position, a step of computing a vector from the boundary of a specific region to the specific position, the specific region being established for fixing the view line direction and view point position of the view point on the perspective projection plane, a step of determining whether or not the specific position is located in the specific region, a step of changing the view line direction or moving the view point position based on the computed vector when the specific position is not located in the specific region, a step of generating a two-dimensional image obtained by perspective-projecting the image model on the perspective projection plane in the view point coordinate system after changing the view line direction or moving the view point position, and a step of drawing a designated position display marker displaying the designated position on the specific position in superposition on the two-dimensional image.

A third aspect of the present invention that attains the above-described object is a game system including an image display unit for displaying a two-dimensional image obtained by perspective-projecting an image model disposed in a virtual three-dimensional space onto a perspective projection plane in a view point coordinate system of view points set in the virtual three-dimensional space, a designation unit for designating a position on the display plane of the image display unit, a detection unit for detecting the designated position of the designation unit with respect to the display plane of the image display unit, a control unit for execution-controlling a game based on the detection signals from the detection unit and controlling the view point position or view line direction in the virtual three-dimensional space, and a memory for storing the game program, wherein the detection unit detects the designated position of the designation unit with respect to the display plane, and the control unit, according to the game program, computes a specific position on the perspective projection plane corresponding to the designated position, establishes a specific region for fixing the view line direction and view point position of the view point on the perspective projection plane and computes a vector from the boundary of the specific region to the specific position, determines whether or not the specific position is located in the specific region, changes the view line direction or moves the view point position based on the computed vector when the specific position is not located in the specific region, generates a two-dimensional image obtained by perspective-projecting the image model on the perspective projection plane in the view point coordinate system after changing the view line direction or moving the view point position, and draws a designated position display marker displaying the designated position on the specific position in superposition on the two-dimensional image.

In the above method, program and game system according to the present invention, a vector from the boundary of the specific region to the designated position is found as the positional relationship of the designated position and the specific region, and the displacement of the view line direction or the movement of the view point position is controlled correspondingly to the found vector.

In the above method, program and game system according to the present invention, the direction and size of the found vector are computed and the displacement of the view line direction or the movement of the view point position are controlled in the computed direction of the vector at a rate corresponding to the computed size of the vector.

In the above method, program and game system according to the present invention, the specific region can be a circle, and the vector from the boundary of the specific region to the designated position is a vector from the position on the circumference of the circle where it crosses a straight line connecting the center of the circle and the designated position.

In the above method, program and game system according to the present invention, the designation unit may have a light-receiving element and the designated position of the image on the display plane is detected by matching the detection timing of the display light of the display plane by the light-receiving element and the scanning timing of the image display of the display plane.

In the above method, program and game system according to the present invention, the designation unit may have a light-emitting element, and has a light-receiving element for receiving the emitted light from the light-emitting element on the side of the display device and the position on the display plane where the designation unit faces the display device is detected based on the detection of the light-receiving element.

In the above method, program and game system according to the present invention, the designation unit may be a controller simulating the shape of a gun.

Features of the present invention will be further clarified from the embodiments of the invention explained hereinbelow with reference to the appended drawings.

With the display control method in accordance with the present invention, the displayed image can be changed by changing the aiming direction of a gun-type controller by player's operations, that is, by changing the observation point of the player. As a result, the player has a virtual reality feel in a virtual three-dimensional space and can better enjoy a shooting game.

BRIEF DESCRIPTION OF THE DRAWINGS

FIG. 4A illustrates the plane obtained by viewing the virtual three-dimensional space from above the player and explains the case where the view line direction is displaced. This is an example of the image where the gun cursor 101 is in the specific region 100;

FIG. 6 is an embodiment processing flow of changing the display of the perspective-projected image by changing the view line direction in the game device employing the present invention;

DESCRIPTION OF THE PREFERRED EMBODIMENTS

Embodiments according to the present invention will be described below with reference to the appended drawings. The embodiments are explained for understanding the invention, and the technical scope of the invention is not limited thereto.

Figure 1:
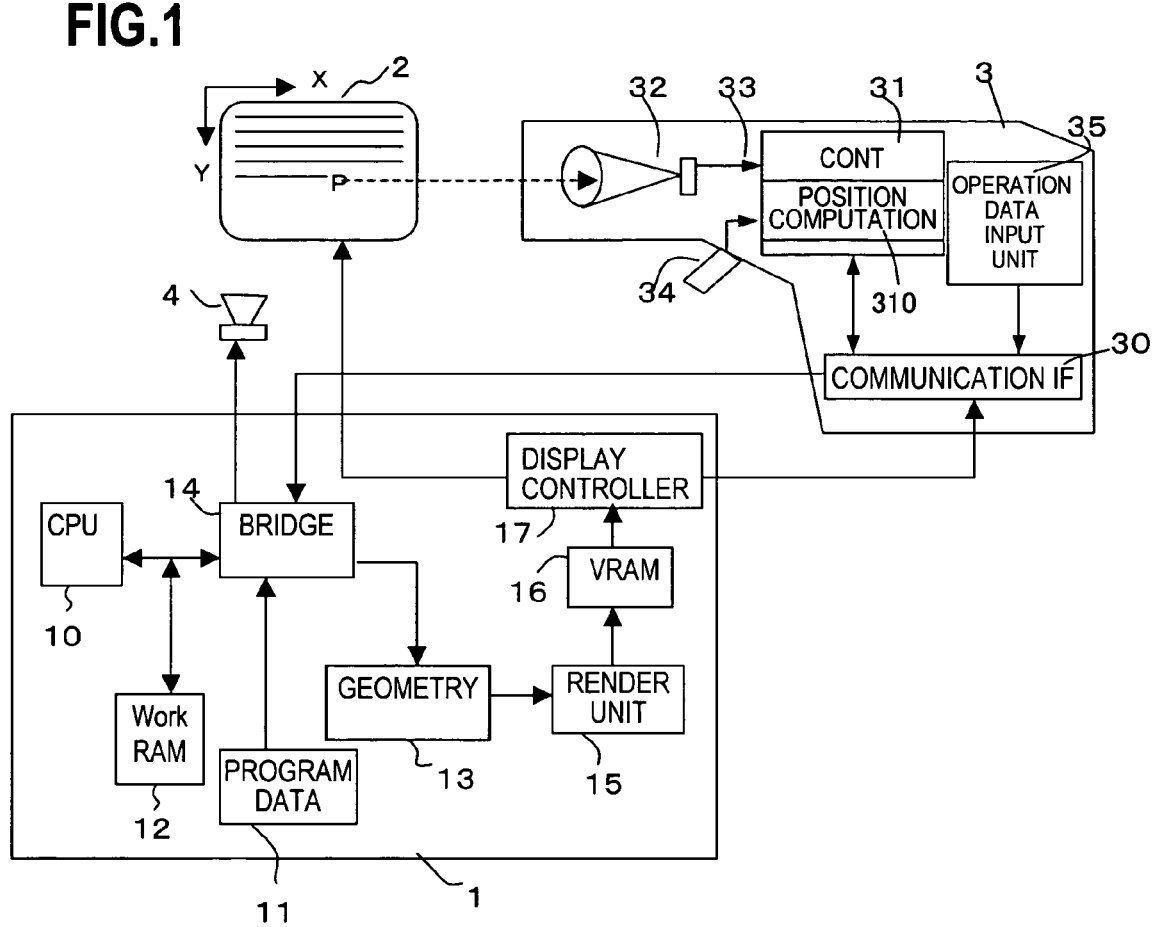
FIG. 1 is a block diagram illustrating an example of the structure of the image display system for realizing the shooting game employing the display control method in accordance with the present invention.

FIG. 1 is a block diagram of a structural example of the image display system for executing a shooting game employing the display control method in accordance with the present invention. Here, the basic operation of the structural example of the image display system shown in FIG. 1 will be overviewed below prior to explaining the specific embodiments of the display control method in accordance with the present invention.

Referring to FIG. 1, an image display system includes an image display device body 1, a monitor device 2, and a gun-type controller 3. Further, a speaker 4 is provided for playing the appropriate effect sound. The gun-type controller 3 and image display device body 1 are electrically connected with a cable or in a wireless fashion. Therefore, a player can hold and operate the gun-type controller 3 independently of the image display device body 1.

The image display device body 1 comprises a CPU 10 for controlling the entire device and executes and controls a program stored in a storage medium 11 such as a hard disk unit or external memory unit. A main memory 12 provides for primary storage of processing data during program execution.

The program is stored together with a display data list in the storage medium 11. The display data list comprises image data for generating an image (referred to simply hereinbelow as perspective-projected image) obtained by perspective-projecting on a two-dimensional coordinate plane, a virtual three-dimensional space and an image model such as characters appearing in the virtual three-dimensional space, which image is displayed on a monitor device 2 correspondingly to the advancement of the program.

The aforementioned image data stored in the storage medium 11 is sent by the CPU 10 via a bridge circuit 14 to a geometry circuit 13 following the execution of the program, and the prescribed coordinate conversion is carried out in the geometry circuit.

In this prescribed coordinate conversion, world coordinate data as image data serving as a basis for three-dimensional image data is, first, coordinate converted into the prescribed three-dimensional space coordinate system. Then, the image data converted to the three-dimensional space coordinate system is converted into a view point coordinate system in which a camera view point (in the shooting game, it is a view point of a player who is a shooting party) as a point of origin.

A render 15 has a function of inputting the image data converted into a view point coordinate system with the geometry circuit 13, perspective-projecting on a two-dimensional plane in the view line direction, conducting a priority processing and applying the prescribed texture, and expanding in a video memory 16.

The video data expanded to the video memory 16 is then synchronized with the timing of horizontal/vertical synchronizing signals by control of the display controller 17 and transmitted to and displayed on the monitor device 2 sequentially for each pixel corresponding to the X, Y coordinate positions on the screen.

The timing signal of transmitting the pixel signals from the display controller 17 to the monitor device 2 is sent to a control circuit 31 via a communication interface 30 of the gun-type controller 3.

The configuration of the gun-type controller 3 will be described below. When a light-receiving lens system 32 is directed toward a bright spot position P on the screen of the monitor device 2, the gun-type controller 3 receives the light via the light-receiving lens system 32 at a timing of light emission in the bright spot position P and the received light is converted into an electric signals with a light-receiving element 33.

The control circuit 31 detects the matching of the generation timing of the electric signal obtained by conversion with the light-receiving element 33 and the operation timing by the player of a trigger switch 34 of the gun-type controller 3. If the timing match is detected, then the electric signal obtained by conversion with the light-receiving element 33 is validated and control is carried out so as to conduct a mark computation processing of finding a coordinate position in the coordinate system of the gun-type controller 3 from the bright spot position P on the screen with a position computation circuit 310.

The coordinate information, which is a coordinate position, in the coordinate system of the gun-type controller, of the bright spot position P computed with the position computation circuit 310 is sent to the main device 1 via a communication interface 30. This computed coordinate information on the bright spot position P is further converted into the coordinate position on the perspective projection plane in the main device 1 and serves as the foundation for hit check made when determining whether or not the shot was made accurately on the character image of the target in the shooting game. The progress of the shooting game is further controlled according to the program.

Features of the image display control method in accordance with the present invention, which is implemented in an image display system for realizing the above-described shooting game will be described below.

Figure 2A:
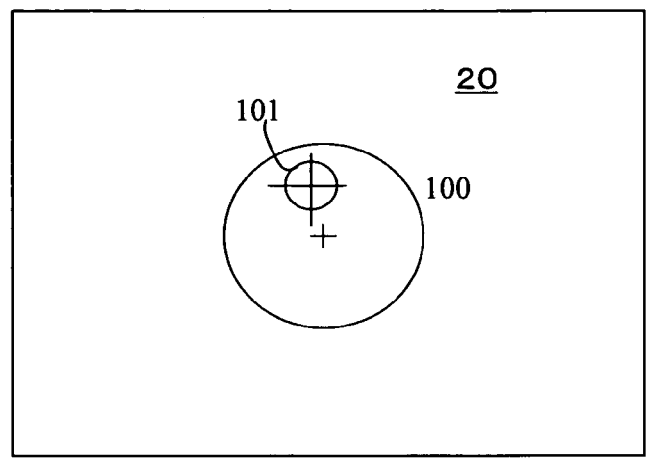
FIGS. 2A through 2C illustrate the specific region 100 and gun cursor 101 displayed on the screen 20 of the monitor device 2 that are specific features of the present invention.
Figure 2B:
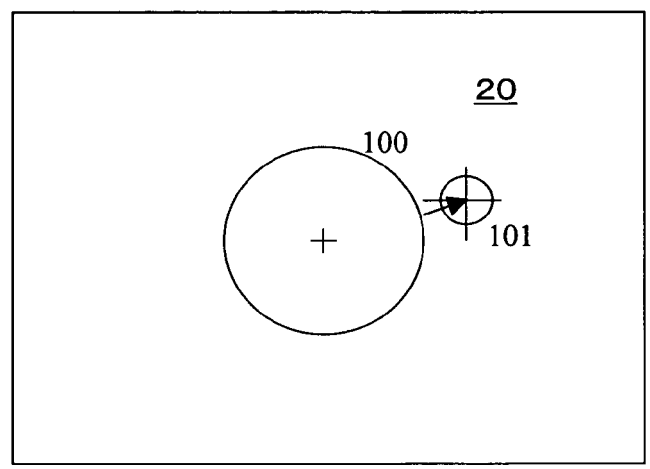
Figure 2C:
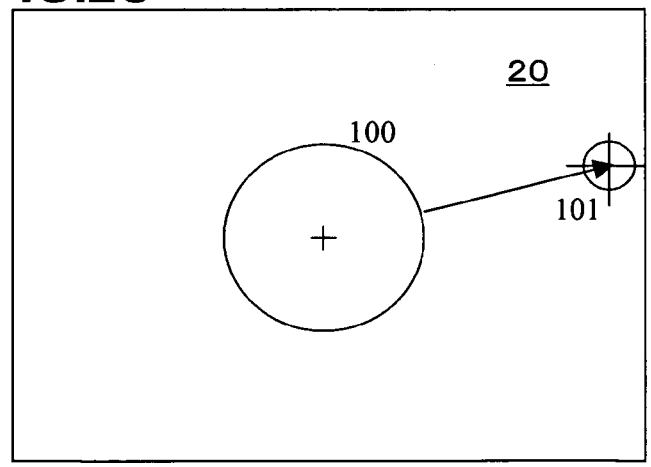

As a specific feature of the present invention, FIGS. 2A through 2C display a specific region 100 (the specific region 100 can be of any shape, for example, it may be of a rectangular shape, but in the figure it is displayed as a circle) and a gun cursor (indicated position display marking) 101 on a screen 20 of the monitor device 2. The gun cursor 101 can have any shape, but in the figure it is shown in the form of a small circle with a cross in the center thereof.

When an image model in a virtual three-dimensional space is perspective-projected on a two-dimensional plane by the render 15 and expanded as image data in the video memory 16, the images of the specific region 100 and gun cursor 101 displayed on the screen 20 are superimposed and drawn on the perspective projection based on the program data stored on the storage medium 11.

Thus, the image that was perspective-projected correspondingly to the initial value in the direction of a line of vision of the view point coordinate system by the render 15 is expanded in the video memory 16 and then, for example, the size of a circle is found as the specific region 100 specified by the program data and the image data of the circle as the specific region 100 found in the video memory 16 is written so as to be superimposed on the prescribed position of the perspective-projected image.

On the other hand, the image data of the gun cursor 101 is similarly superposition drawn on the video memory 16 so as to be displayed in the prescribed mutual relationship with the specific region 100 written in the video memory 16.

The image data thus expanded in the video memory 16 is sent by the display controller 17 to the display unit 2, and the images of the specific region 100 and gun cursor 101 are displayed, as shown in FIG. 2a through 2C on the perspective-projected image.

FIGS. 2A through 2C illustrate the relationship between the specific region 100 and gun cursor 101; here the image of the perspective-projected image model comprising the character image, which is the target, is not shown.

FIG. 2A shows an example in which the gun cursor 101, which is a main view point display in the initial state, is displayed inside the specific region 100. If the aiming direction of the gun-type controller 2 is changed by the player in the state shown in FIG. 2A, then the display position of the gun cursor 101 moves correspondingly to the changed aiming direction, as in the example shown in FIGS. 2B, 2C. Further, in FIG. 2A, the gun cursor 101 is located inside the specific region 100, and FIG. 2B and FIG. 2C represent the state in which the gun cursor 101 is outside the specific region 100.

A specific feature of the display control method in accordance with the present invention is that when the gun cursor 101 is located outside the specific region 100, as shown in FIG. 2B and FIG. 2C, the display change of the perspective-projected image is controlled so that the view line direction of the player in the virtual three-dimensional space is displayed or the view point position is moved correspondingly to the vector direction and size of the gun cursor 101 from the specific region 100.

Figure 3A:
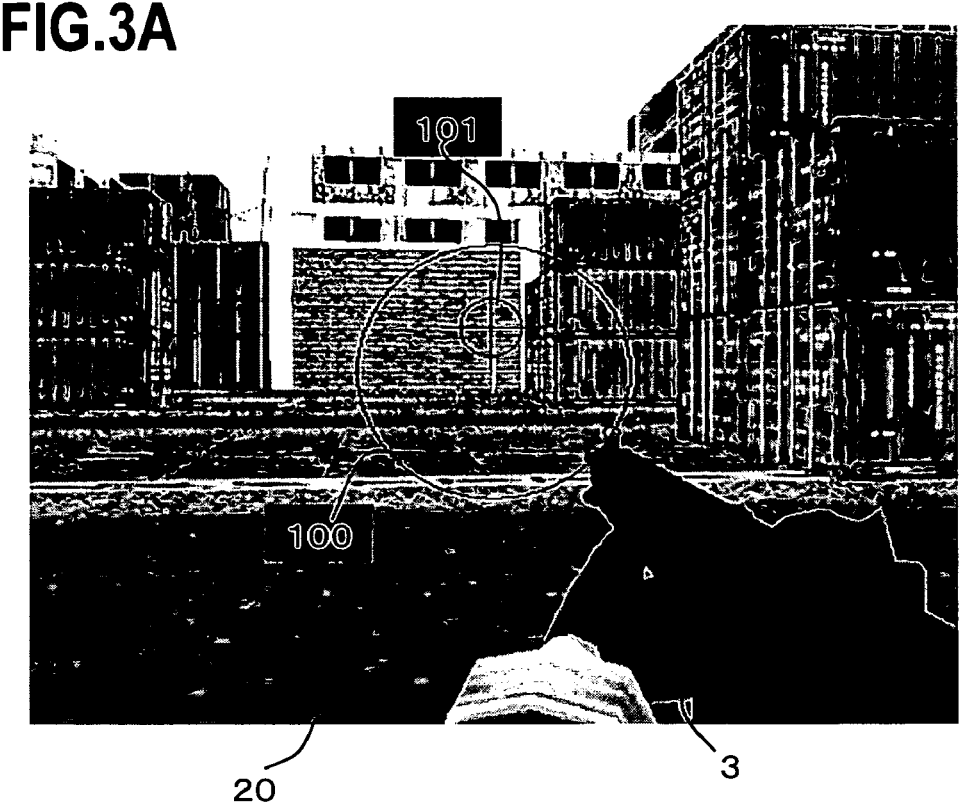
FIGS. 3A & 3B are an example of the display screen 20 of the monitor device 2 obtained when the gun muzzle (aim) of the gun-type controller 3 is in a certain direction.
Figure 3B:
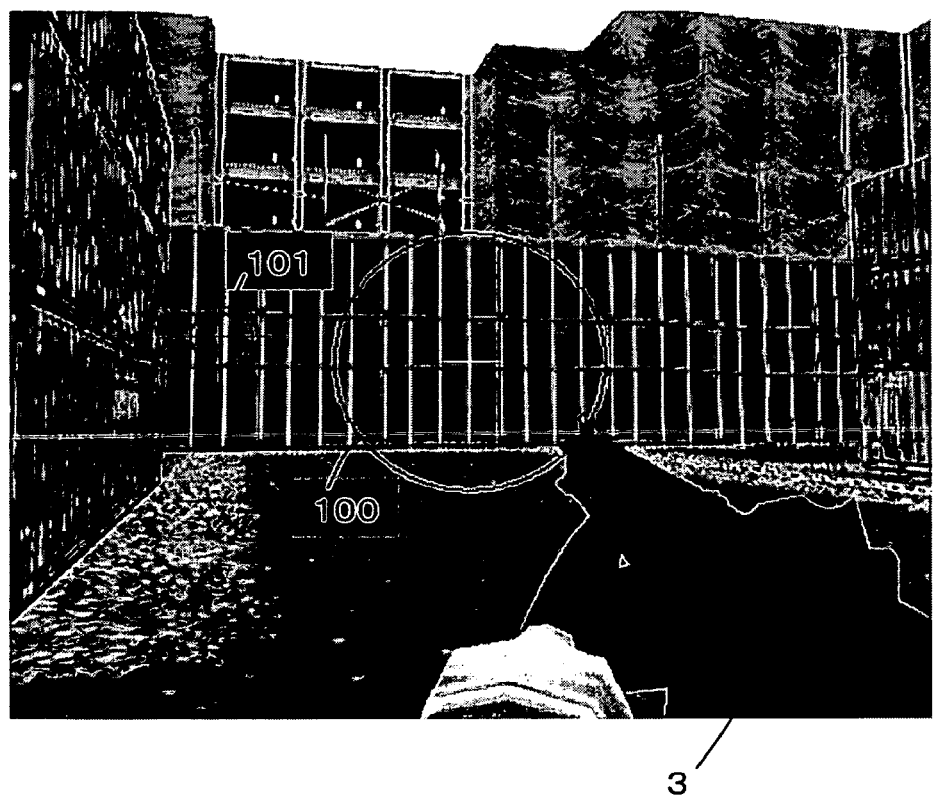

FIGS. 3A & 3B show an example of the display screen 20 of the monitor device 2 relating to the case where the gun muzzle (aim) of the gun-type controller 3 is in the certain direction. FIG. 3A and FIG. 3B display the image of the gun-type controller 3 held with a left hand by the player in the downward and leftward direction.

FIG. 3A shows an image example in which the gun cursor 101 is present inside the specific region 100. FIG. 3B shows an image relating to a state in which the direction of the gun muzzle (aim) of the gun-type controller 3 is to the left and the gun cursor 101 moves correspondingly to the outside of the specific region 100. The perspective-projected image shown in FIG. 3A and FIG. 3B is changed at a rate corresponding to the size of the vector from the specific region 100 to the gun cursor 101, regardless of whether the view line direction is displaced or the view point position is moved.

Further, the change in the perspective-projected image is terminated by controlling the direction of the gun muzzle (aim) of the gun-type controller 3 so as to return the gun cursor 101 into the specific region 100. The enemy character image, which is considered as a target of the shooting game, is not displayed in FIG. 3A and FIG. 3B, but the enemy character image is displayed on the perspective-projected image following the shooting game program. The hit check processing representing the results of shooting at the enemy character image has been mentioned hereinabove, but because it has no direct relation to the object of the present invention, further explanation thereof is omitted.

Further, in FIG. 3B, the perspective-projected image is displayed on a larger scale than in FIG. 3A. This figure illustrates the state in which a zoom signal was generated from an operation data input unit 35 by operation of a zoom input button (not shown in the figure) of the gun-type controller 101 in the system shown in FIG. 1 and this zoom signal was inputted in the display device body 1, thereby expanding the image that is perspective-projected by program control.

Changes in the perspective-projected image in the case where the view line direction has displaced and the case where the view point position has moved will be described below based on a specific example.

FIG. 4A is an explanatory drawing of a plane observed by viewing the virtual three-dimensional space from above the player. This figure illustrates the case where the view line direction is displaced.

As shown in FIG. 4A, in a certain view line direction I, the three-dimensional space coordinate data is perspective-projected onto a two-dimensional plane and displayed on the monitor device 2. The view field range at this time is a view field BR1.

Figure 4B:
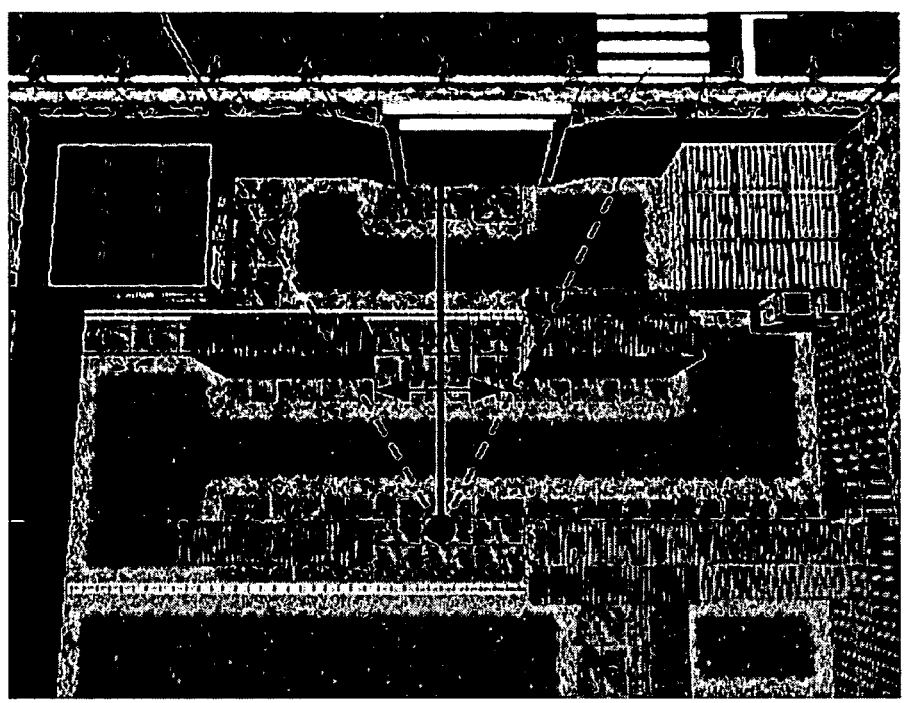
FIG. 4B is an example of a three-dimensional spatial image corresponding to the view line direction I in FIG. 4A; this image is viewed from above the player.
Figure 4C:
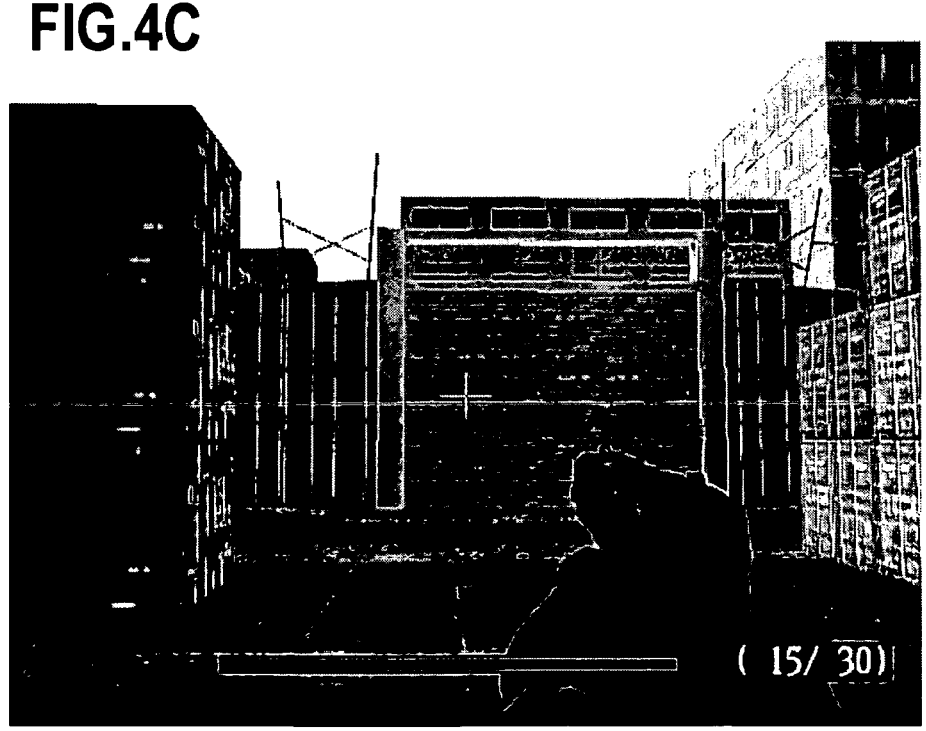
FIG. 4C is an example of an image obtained by perspective projection on a two-dimensional plane and displayed on the monitor device 2, this image corresponding to FIG. 4B.

FIG. 4B shows an example of the three-dimensional space image corresponding to the view line direction I in FIG. 4A, and this image is viewed from above the player. FIG. 4C is an example of the image corresponding to FIG. 4B, and this image is perspective-projected on the two-dimensional plane and displayed on the monitor device 2.

Figure 4D:
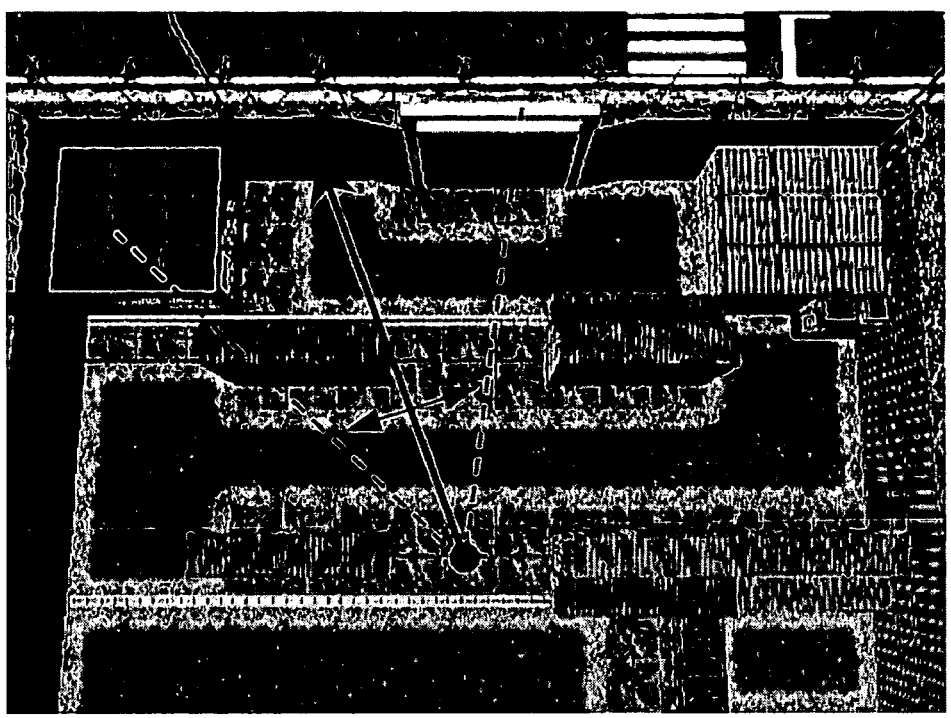
FIG. 4D is an example of a three-dimensional spatial image corresponding to the view line direction II in FIG. 4A; this image is viewed from above the player.
Figure 4E:
FIG. 4E is an example of an image obtained by perspective projection on a two-dimensional plane and displayed on the monitor device 2, this image corresponding to FIG. 4D.

Returning to FIG. 4A, if the view line direction is in the II direction, with a view point position O as a center, then the view field range in which the three-dimensional coordinate data is perspective-projected onto the two-dimensional plane and displayed on the monitor device 2 will be changed into the view field BR2. FIG. 4D is an example of the three-dimensional spatial image corresponding to the view line direction II in FIG. 4A, this image being viewed from above the player. FIG. 4E is an example of image corresponding to FIG. 4D, which is perspective-projected onto the two-dimensional plane and displayed on the monitor device 2. The view line direction is changed to the left with respect to FIG. 4B. It follows herefrom that the direction of the image perspective-projected onto the two-dimensional plane and displayed on the monitor device 2, as shown in FIG. 4E, also changes.

Figure 5A:
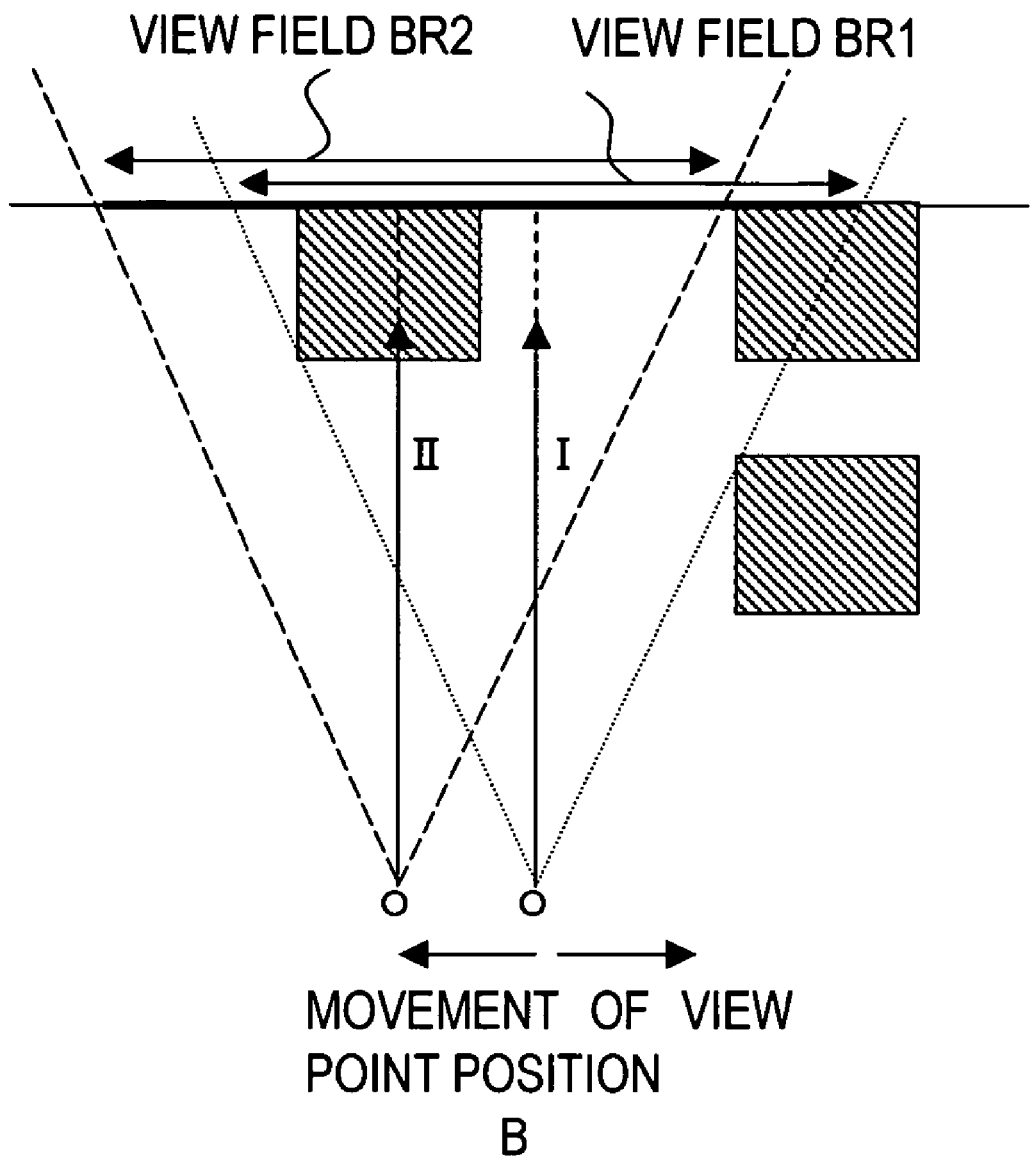
FIG. 5A is a plan view obtained by viewing a virtual three-dimensional space from above the player; this view illustrates the case where the view point position is moved.

FIG. 5A is a plan view obtained by viewing the virtual three-dimensional space from above the player, this view illustrating the case where the view line position is moved.

As shown in FIG. 5A, in a certain view point position O, the three-dimensional coordinate data is perspective-projected onto a two-dimensional surface and displayed on the monitor device 2. The view field range at this time is a view field BR1 and is identical to the case where the view line direction in FIG. 4A is the I direction.

Figure 5B:
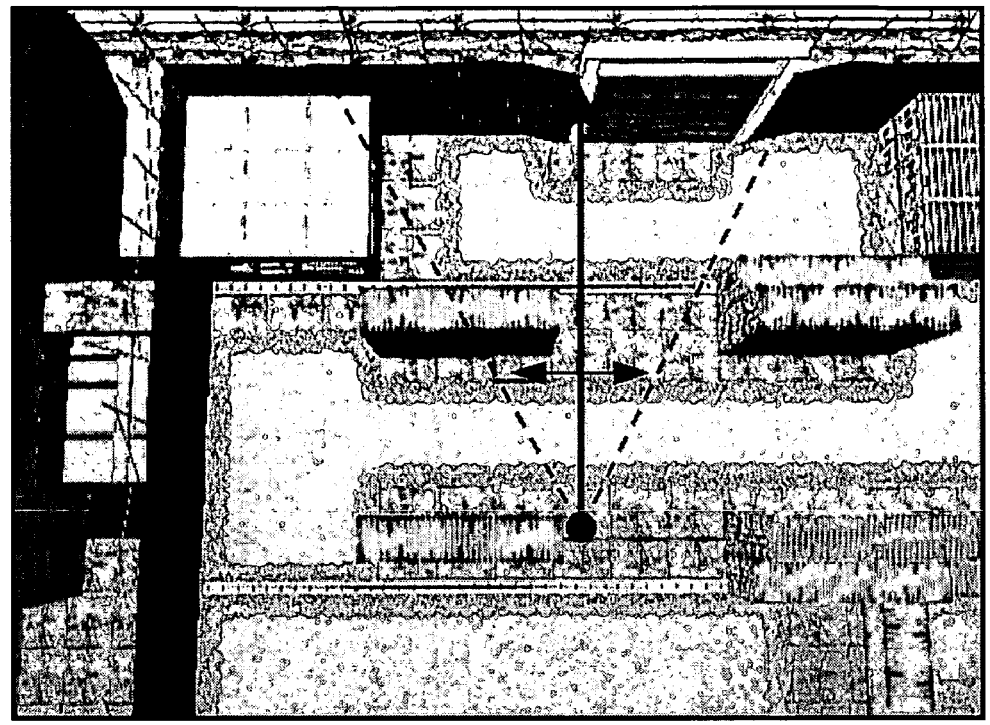
FIG. 5B is an example of a three-dimensional spatial image corresponding to the view line direction II in FIG. 5A and obtained when the view point position was moved to O'; this image is viewed from above the player.

If the view point position O moves to O', the view field range becomes the view field BR2. FIG. 5B is an example of a three-dimensional spatial image corresponding to the view line direction II in FIG. 5A and viewed when the view point position moved to O'. This image is viewed from above the player.

Figure 5C:
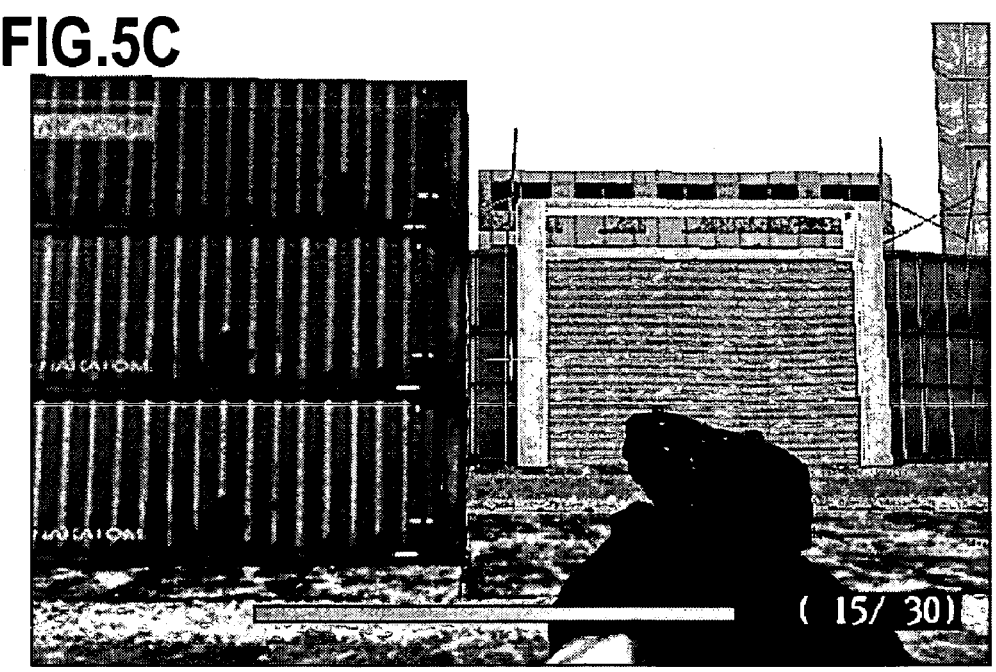
FIG. 5C is an example of an image obtained by perspective projection on a two-dimensional plane and displayed on the monitor device 2, this image corresponding to FIG. 5B.

FIG. 5C is an example of the image perspective-projected onto a two-dimensional plane and displayed on the monitor device 2, this example corresponding to FIG. 5B. The comparison of FIG. 4B and FIG. 4C shows that the view point position shifted leftward and the perspective-projected image moved accordingly to the left parallel to itself.

FIG. 6 shows a processing flow of a working example of the present invention in which the display of the perspective-projected image is changed by the displacement of the view line direction by using the specific region 100 and gun cursor 101 in the game apparatus employing the present invention.

Referring to FIG. 6, if the game is started, the specific region 100 and gun cursor 101 generated based on the display data list stored in the storage medium 11 are displayed in superposition on the perspective-projected image (not shown in FIGS. 2A through 2C), as shown in FIGS. 2A through 2C, as the initial screen (step S1).

In the initial state, the gun cursor 101 is displayed in the prescribed position set in advance by the program in the specific region 100.

As long as the gun cursor 101 is located in this specific region 100, the perspective-projected image is not changed, except for the movement and change of the enemy character image according to the program.

Here, referring to FIG. 1, the bright point position P corresponding to the main view point on the screen of the monitor device 2 onto which the gun-type controller 3 is directed is received by the light-receiving element 33 via the optical system 32.

The position computation unit 310 in the control circuit 31 of the gun-type controller 3 stops the X direction counter and Y direction counter (not shown in the figure) that advance stepwise synchronously with the timing of the horizontal/vertical synchronizing signals sent from the display controller 17. As a result, the coordinate (X, Y) data of the gun controller system corresponding to the position of the observation point (aim position) on the display of the monitor device 2 onto which the gun-type controller 3 is directed is acquired (step S2).

If the coordinate (X, Y) data of the gun controller system is inputted, it is converted into the coordinate on the perspective projection plane, as described hereinabove, in the display device body 1 and it is determined whether or not the already acquired value of the acquired position coordinate (X, Y) data of the gun cursor 101 (aim position) is an error (step S3).

Here, the case where the already acquired value is an error is the case where the obtained coordinate of the aim position is in a position displaced from the perspective projection plane, that is, outside the screen or in the peripheral region, which is a display boundary on the screen of the monitor device 2.

When the already acquired value is an error (step 3, Y), the coordinate position of the gun cursor 101 that was detected in the previous cycle is used as is and the direction and size of the vector directed from the specific region 100 to the coordinate position of the gun cursor 101 are found (step S4).

On the other hand, when the already acquired value is not an error (step S3, N), the direction and size of the vector from the specific region 100 to the obtained coordinate position of the cut cursor 101 are found (step S5).

Whether or not the gun cursor 101 found as described above is within the specific region 100 is then determined (step S6).

When the gun cursor is in the specific region 100 (step S6, Y), the view line direction is not changed and no changes are provided to the perspective-projected image. However, the displayed position and displayed state of the enemy character image of the shooting game controlled by the program is controlled by the program.

When the gun cursor 101 found as described above is not in the specific region 100, the view line direction is changed, as described with reference to FIG. 4A, at a rate corresponding to the vector size according to the vector direction, and the perspective-projected image changes accordingly (step S7).

The perspective-projected image that was changed by the change of the view line direction is displayed (step S8), and without an end command (step S9, N), the processing flow returns to step S2, the above-described processing is repeated, and the game continues.

In the above-described processing flow, the order of the processing of steps S5 and S6 can be inverted. Thus, as shown in FIG. 7 illustrating processing of another embodiment corresponding to FIG. 6, because the coordinate position of gun cursor 101 is detected in step S2, it is easy to determine whether or not the detected coordinate position is in the specific region 100.

Figure 7:
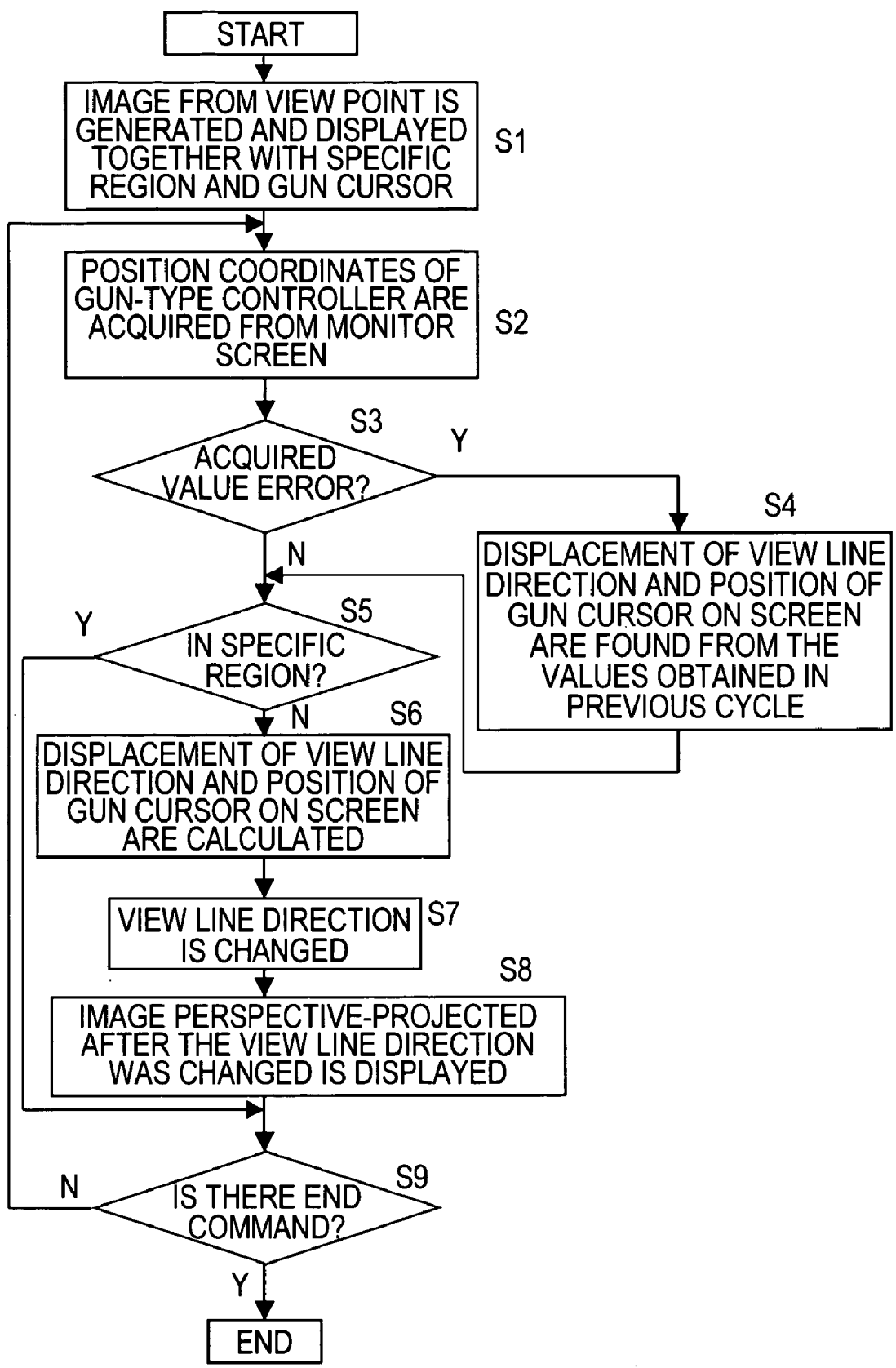
FIG. 7 illustrates processing flow of another embodiment corresponding to FIG. 6.

Therefore, in the processing flow shown in FIG. 7, whether or not the detected coordinate position of the gun cursor 101 and the value of the previous cycle found in the case of the already acquired value error (step S3, Y) are in the specific region 100 is determined earlier in step S5.

When the coordinate position is determined to be outside the specific region 100 (step S5, N), the vector direction and size are calculated, the view line direction is changed accordingly, as explained with reference to FIG. 4A, and control is conducted so that the perspective-projected image changes according to those changes (step S7).

The advantage of the processing flow shown in FIG. 7 over the processing flow of the embodiment shown in FIG. 6 is that the number of calculation events can be reduced because the vector direction and size are calculated only when the detected coordinate position of the gun cursor 101 is outside the specific region.

Figure 8:
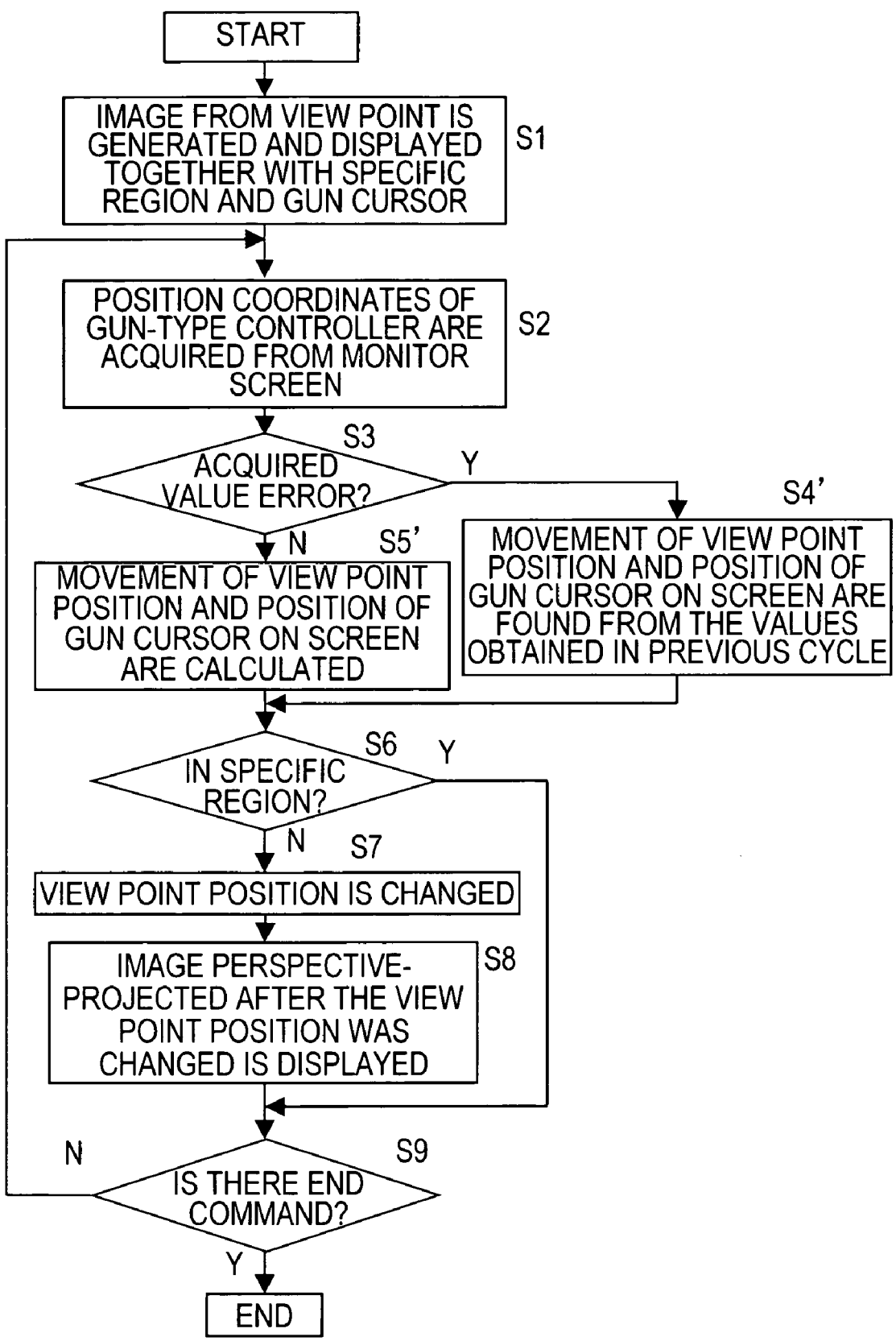
FIG. 8 is a processing flow corresponding to an embodiment of the present invention in which the display of the perspective-projected image is changed by moving the view point positioning the game device employing the present invention.

FIG. 8 shows a processing flow corresponding to the embodiment of the present invention in which the display of the perspective-projected image is changed by the movement of the view point position O explained with reference to FIG. 5A by using the specific region 100 and gun cursor 101 in the game device employing the present invention.

Features of this processing can be easily understood by comparing with the processing flow of the embodiment shown in FIG. 6. Thus, in the processing of FIG. 6, the view point direction of the gun cursor 101 is found in steps S4, S5. By contrast, in the example shown in FIG. 8, the view point position is found (steps S4', S5'). Therefore, when the coordinate of the gun cursor 101 is outside the specific region 100, the view point position changes to O', which is different from the view point position O, and the perspective-projected image is changed based on the corresponding vector direction and vector size.

In the processing flow of FIG. 8, too, the processing order of step S5' and step S6 can be reversed, as in the above-described processing flow of FIG. 7.

Figure 9:
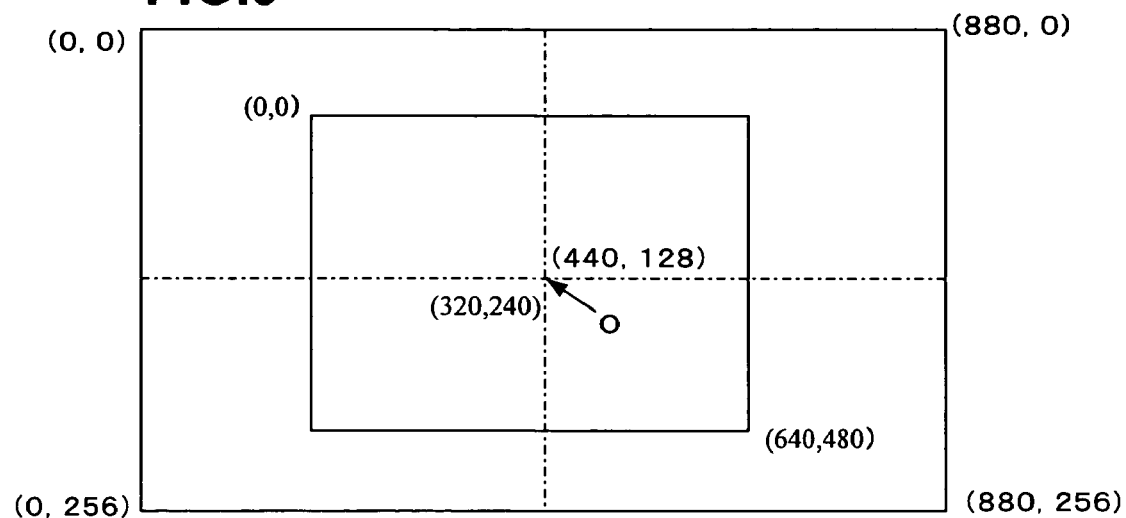
FIG. 9 illustrates an embodiment of display control corresponding to FIG. 6, this embodiment relating to the case of using a gun control coordinate system.

FIG. 9 illustrates an embodiment of display control corresponding to FIG. 6 relating to the case where the gun control coordinate system is used.

Referring to FIG. 9, for example, coordinate data having coordinate positions (0, 0)-(880, 256) as a gun control coordinate system are provided to the position computation circuit 310 of the gun-type controller 3. The control corresponding to FIG. 6 will be explained below as an embodiment by taking the resolution of the projection projected plane expanded in the video memory 16 (or when the resolutions match, the resolution of the screen 20 of the monitor device 2 can be also considered) as 640×480.

FIG. 9 shows the relationship between the gun control coordinate system having the aforementioned coordinate positions (0, 0)-(880, 256) and the coordinates of the projected projection plane with a resolution set to 640×480 to facilitate the understanding of the following explanation. The central position coordinate (440, 128) of the gun control coordinate system corresponds to the central position (320, 240) of the projection projected plane.

Explaining with reference to FIG. 6, the gun-type controller 3 is directed toward the screen 20 and the position coordinates of the bright point position P on the corresponding screen in the gun control coordinate system are acquired (step S2). The acquired coordinates are taken, for example, as (X, Y)=(577, 154).

Here, when the acquired position coordinate is (1, 5) or (0, 5), it is outside the projection projected plane due to data properties. Therefore, the already acquired value error is judged (step S3, Y). Further, in this case the position of gun cursor and the change of the view line direction of the perspective-projected image are found from the values of the previous cycle (step S4).

The aforementioned acquired position coordinates (X, Y)=(577, 154) are other than (1, 5) or (0, 5) (step S3, N). Therefore, the detected coordinate position in the gun control coordinate system is recalculated in the coordinates on the perspective projection plane and the position of gun cursor on the transmitted projection plate is found (step S5).

The recalculation processing in step S5 is carried out in the manner as follows. The central point O of the coordinate system shown in FIG. 9 is found as a reference.

As an example, the central position coordinate of the gun control coordinate system is taken as (X: 440, Y: 128). Therefore, the size of displacement of the acquired position coordinate (X, Y)=(577, 154) from the center is:

$X: 577-440=137.$ $Y: 154-128=26.$

On the other hand, if the displacement values in the X axis direction and Y axis direction in the perspective projection plane, which are wished to be found, are denoted by x and y, respectively, then because the relationship shown in FIG. 9 gives x: (gun control coordinate system data)=(½ coordinate on the perspective projection plane):(½ gun control coordinate system), the following results are obtained:

$x=137\times(640/2)/(880/2)=99.636.$ $y=26\times(480/2)/(256/2)=48.75.$

Therefore, the coordinate position (419.636, 288.75) of the perspective projection plane is found by adding (320, 240), which is the central coordinate of the perspective projection plane, to those values.

Whether or not the found position of the gun cursor 101 is in the specific region 100 is then determined (step S6). If it is in the specific region 100, the processing ends (step S6, Y).

The determination as to whether or not the gun cursor 101 is in the specific region 100 is made by judging whether or not the following conditions are met.

Figure 10:
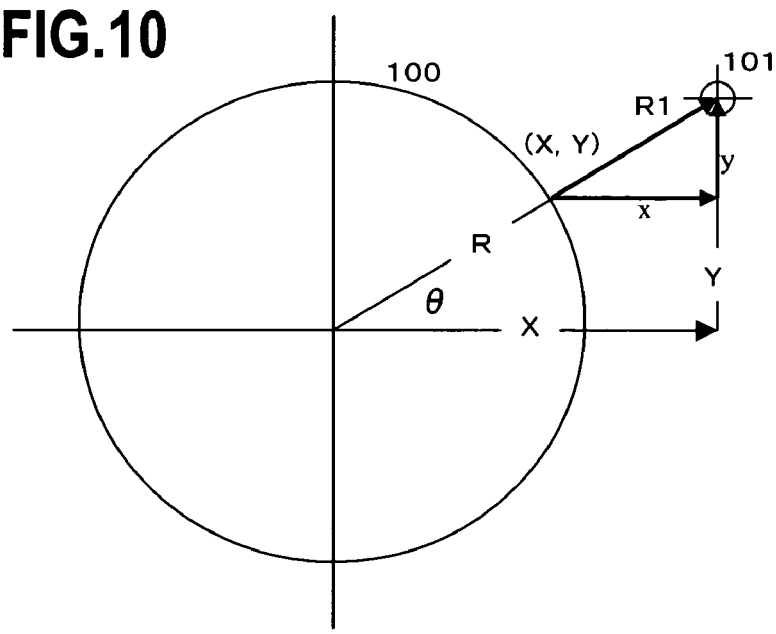
FIG. 10 illustrates a method of determination whether or not the found position of the gun cursor is in the specific region.

In an embodiment, the radius R of the specific region 100 is 80.0 as a default value, as shown in FIG. 10. Therefore, due to the relationship $(80.0^2)<(99.636^2+48.75^2)$, the gun cursor 101 is judged to be outside the specific region 100, as shown in FIG. 10.

Because the gun cursor 101 is outside the specific region 100, the displacement amount of the view line direction with respect to the perspective-projected image is then calculated (step S7). As the processing of step S7, first, the angle of the acquired data is found and the difference from specific region 100 is found in order to obtain the extension R1 of the gun cursor position from the specific region 100.

The angle of the acquired data is expressed as follows.

Angle: $\tan\theta=(48.75/99.636)$ $\theta=\tan^{-1}(48.75/99.636)$ $\theta=26.0720.$ X and Y on the specific region 100 are as follows.

$X=80.0\times\cos(26.072)=71.859.$ $Y=80.0\times\sin(26.072)=35.160.$

Therefore, the extension from the specific region 100 is $x=99.636-71.859=27.777,$ $y=48.75-35.160=13.59.$ Considering the x, y ratios taken as a reference (0, 0) on the specific region 100, in order to display on the screen 20, scaling is conducted to obtain the ratio with the screen of 0.0-1.0.

$x=27.777/(320-71.859)=0.112,$ $y=13.59/(240-35.160)=0.007.$

Here, if the maximum value of the displacement of the perspective-projected image in the view line direction is taken as (90°, 60°), the following rotational displacements are possible in the x, y directions.

$x: 90°\times0.112=10.08°,$ $y: 60°\times0.007=0.420.$

Therefore, a perspective-projected image can be obtained in which the view line direction was displaced, for example, from the view line direction I to the view line direction II in FIG. 4A by rotational displacement (x, y)=(10.08°, 0.42°) of the view line direction in the three-dimensional coordinate space, as described hereinabove.

Then, returning to FIG. 6, the perspective-projected image in the state with the rotational displacement of the view line direction, which was found as described above, and the gun cursor 101 are displayed on the screen (step S8).

Further, if the player issues an end command (step S9, Y), the processing ends. In the explanation of the above-described embodiment, the light emission timing of the monitor device 2 was explained to be detected with the light-receiving element 3 of the gun-type controller 3. However, the employment of the present invention is not limited to such a configuration. Thus, a configuration can be also used in which the light-emitting element is provided on the gun-type controller 3, a light-receiving element for receiving the light emitted from the light-emitting element is provided on the monitor device 2, and the coordinate position of the gun-type controller 3 in the direction of the monitor device 2 is detected based on the detection the light-receiving element.

As described hereinabove, with the present invention, the player can displace the direction of the view line disposed in the three-dimensional space coordinate system or move the position of the view point therein and to change the corresponding perspective-projected image by changing the aim of the gun-type controller. Therefore, the excitement of playing in a virtual three-dimensional space can be heightened. As a result, an increased demand for shooting games can be anticipated and a significant industrial effect is obtained.

What is claimed is:

1. An image display control method in a game system having an image display unit for displaying a two-dimensional image obtained by perspective-projecting an image model disposed in a virtual three-dimensional space onto a perspective projection plane in a view point coordinate system of view points set in said virtual three-dimensional space; a designation unit for designating a position on the display plane of said image display unit; a detection unit for detecting the designated position of said designation unit with respect to the display plane of said image display unit; and a control unit for execution-controlling a game based on the detection signals from said detection unit and controlling said view point position or view line direction in said virtual three-dimensional space, the method comprising the steps of:
setting a specific region on said perspective projection plane;
detecting the designated position with respect to said display plane, which is designated by said designation unit;
determining whether or not said designated position is located in said specific region;
displacing said view line direction or moving the view point position based on the positional relationship of said designated position and said specific region when said designated position is not positioned inside said specific region; and
finding a two-dimensional image obtained by perspective projection in the new view line direction after the displacement of said view line direction or movement of the view point position and displaying this two-dimensional image on said display device.

2. The image display control method according to claim 1, wherein a vector from the boundary of said specific region to said designated position is found as the positional relationship of said designated position and said specific region, and the displacement of said view line direction or the movement of the view point position is controlled correspondingly to said found vector.

3. The image display control method according to claim 2, wherein the direction and size of said found vector are computed and the displacement of said view line direction or the movement of the view point position are controlled in the computed direction of said vector at a rate corresponding to the computed size of said vector.

4. The image display control method according to claim 3, wherein said specific region is a circle, and the vector from the boundary of said specific region to said designated position is a vector from the position on the circumference of said circle where it crosses a straight line connecting the center of said circle and said designated position.

5. The image display control method according to claim 3, wherein said designation unit has a light-receiving element, and the designated position of said image on the display plane is detected by matching of the detection timing of the display light of said display plane by said light-receiving element and the scanning timing of the image display of said display plane.

6. The image display control method according to any of claim 3, wherein said designation unit has a light-emitting element, and has a light-receiving element for receiving the emitted light from said light-emitting element on the side of said display device and the position on the display plane where said designation unit faces said display device is detected based on the detection of said light-receiving element.

7. The image display control method according to claim 2, wherein said specific region is a circle, and the vector from the boundary of said specific region to said designated position is a vector from the position on the circumference of said circle where it crosses a straight line connecting the center of said circle and said designated position.

8. The image display control method according to claim 2, wherein said designation unit has a light-receiving element, and the designated position of said image on the display plane is detected by matching of the detection timing of the display light of said display plane by said light-receiving element and the scanning timing of the image display of said display plane.

9. The image display control method according to any of claim 2, wherein said designation unit has a light-emitting element, and has a light-receiving element for receiving the emitted light from said light-emitting element on the side of said display device and the position on the display plane where said designation unit faces said display device is detected based on the detection of said light-receiving element.

10. The image display control method according to claim 1, wherein said designation unit has a light-receiving element, and the designated position of said image on the display plane is detected by matching of the detection timing of the display light of said display plane by said light-receiving element and the scanning timing of the image display of said display plane.

11. The image display control method according to any of claim 1, wherein said designation unit has a light-emitting element, and has a light-receiving element for receiving the emitted light from said light-emitting element on the side of said display device and the position on the display plane where said designation unit faces said display device is detected based on the detection of said light-receiving element.

12. A computer storage medium containing a computer program for executing in a game system comprising:
an image display unit for displaying a two-dimensional image obtained by perspective-projecting an image model disposed in a virtual three-dimensional space onto a perspective projection plane in a view point coordinate system of view points set in said virtual three-dimensional space;
a designation unit for designating a position on the display plane of said image display unit;
a detection unit for detecting the designated position of said designation unit with respect to the display plane of said image display unit; and
a control unit for execution-controlling a game based on the detection signals from said detection unit and controlling said view point position or view line direction in said virtual three-dimensional space,
said computer program when executing performing the steps of:
detecting in said detection unit the designated position of said designation unit with respect to said display plane;
computing with said control unit a specific position on said perspective projection plane corresponding to said designated position;
computing a vector from the boundary of a specific region to said specific position, said specific region being established for fixing the view line direction and view point position of said view point on said perspective projection plane;
determining whether or not said specific position is located in said specific region;
changing the view line direction or moving the view point position based on said computed vector when said specific position is not located in said specific region;

generating a two-dimensional image obtained by perspective-projecting said image model on the perspective projection plane in the view point coordinate system after changing the view line direction or moving the view point position; and drawing a designated position display marker displaying said designated position on said specific position in superposition on said two-dimensional image.

13. The computer storage medium containing a program according to claim 12, wherein said specific region is a circle, and the vector from the boundary of said specific region to said designated position is a vector from the position on the circumference of said circle where it crosses a straight line connecting the center of said circle and said designated position.

14. A game system comprising:

an image display unit for displaying a two-dimensional image obtained by perspective-projecting an image model disposed in a virtual three-dimensional space onto a perspective projection plane in a view point coordinate system of view points set in said virtual three-dimensional space;

a designation unit for designating a position on the display plane of said image display unit;

a detection unit for detecting the designated position of said designation unit with respect to the display plane of said image display unit;

a control unit for execution-controlling a game based on the detection signals from said detection unit and controlling said view point position or view line direction in said virtual three-dimensional space; and a memory for storing the game program, wherein said detection unit detects the designated position of said designation unit with respect to said display plane; and said control unit, according to said game program, computes a specific position on said perspective projection plane corresponding to said designated position;

establishes a specific region for fixing the view line direction and view point position of said view point on said perspective projection plane and computes a vector from the boundary of said specific region to said specific position;

determines whether or not said specific position is located in said specific region;

changes the view line direction or moves the view point position based on said computed vector when said specific position is not located in said specific region;

generates a two-dimensional image obtained by perspective-projecting said image model on the perspective projection plane in the view point coordinate system after changing the view line direction or moving the view point position; and draws a designated position display marker displaying said designated position on said specific position in superposition on said two-dimensional image.

15. The game system according to claim 14, wherein said specific region is a circle, and the vector from the boundary of said specific region to said designated position is a vector from the position on the circumference of said circle where it crosses a straight line connecting the center of said circle and said designated position.

16. The game system according to claim 15, wherein said designation unit has a light-receiving element, and the designated position of said image on the display plane is detected by matching of the detection timing of the display light of said display plane by said light-receiving element and the scanning timing of the image display of said display plane.

17. The game system according to claim 15, wherein said designation unit has a light-emitting element, and has a light-receiving element for receiving the emitted light from said light-emitting element on the side of said display device and the position on the display plane where said designation unit faces said display device is detected based on the detection of said light-receiving element.

18. The game system according to claim 14, wherein said designation unit has a light-receiving element, and the designated position of said image on the display plane is detected by matching of the detection timing of the display light of said display plane by said light-receiving element and the scanning timing of the image display of said display plane.

19. The game system according to claim 14, wherein said designation unit has a light-emitting element, and has a light-receiving element for receiving the emitted light from said light-emitting element on the side of said display device and the position on the display plane where said designation unit faces said display device is detected based on the detection of said light-receiving element.

* * * * *